United States Patent [19]
Suzuki

[11] Patent Number: 6,010,063
[45] Date of Patent: Jan. 4, 2000

[54] MULTIPLYING METHOD WITH A ROUND-OFF FUNCTION AND CIRCUITRY THEREFOR

[75] Inventor: Kazumasa Suzuki, Tokyo, Japan

[73] Assignee: NEC Corporation, Japan

[21] Appl. No.: 08/959,851

[22] Filed: Oct. 29, 1997

[30]     Foreign Application Priority Data

Oct. 31, 1996  [JP]  Japan ................................. 8-305801

[51] Int. Cl.[7] ................................................. G06C 23/00
[52] U.S. Cl. ...................................... 235/62 F; 235/63 E
[58] Field of Search ........................... 235/63 A–63 C, 235/62 F, 441, 492; 364/754, 757, 758

[56]            References Cited

U.S. PATENT DOCUMENTS

| | | | |
|---|---|---|---|
| 4,229,800 | 10/1980 | Gregorian et al. | ...................... 364/745 |
| 5,444,647 | 8/1995 | Komoda | .................. 364/761 |
| 5,619,440 | 4/1997 | Komoda | .................. 364/754 |

FOREIGN PATENT DOCUMENTS

| | | |
|---|---|---|
| 562513 | 3/1993 | European Pat. Off. . |
| 545654 | 6/1993 | European Pat. Off. . |
| 782319 | 7/1997 | European Pat. Off. . |
| 64-53228 | 3/1989 | Japan . |
| 6-103304 | 4/1994 | Japan . |

OTHER PUBLICATIONS

Lu, F. et al., "A Bit–Level Pipelined Implementation of a CMOS Multiplier–Accumulator Using a New Pipelined Full–Adder Cell Design", *Proceedings of the Annuel International Phoenix Conference on Computers an Communications*, Scottsdale, Mar. 22–24, 1989, No. 1989, Mar. 22, 1989, Institute of Electrical and Electronics Engineers, pp. 49–53.

*Primary Examiner*—Thien Minh Le
*Attorney, Agent, or Firm*—Ostrolenk, Faber, Gerb & Soffen, LLP

[57]            ABSTRACT

A multiplying method with a negative/positive symmetrical round-off function and circuitry therefor are disclosed. When a product is positive, a value having a (logical) ONE at the uppermost one of bits to be rounded and ZEROs at the lower bits is rounded up. When a product is negative, a value having a (logical) ONE at the uppermost one of bits to be rounded and ZEROs at the lower bits is rounded down. This rounds off the product such that a mean accumulative error when the product is positive and a mean cumulative error when it is negative cancel each other. When a product is positive, a correction term having a ONE at the uppermost one of the bits to be rounded and ZEROs at the lower bits is applied to a subproduct adder and an adder. For a negative product, the correction term has a ZERO at the above uppermost bit and ZEROs at the lower bits.

5 Claims, 10 Drawing Sheets

```
        1000   -8      MULTIPLICAND X
    ×   1001   -7      MULTIPLIER Y
        00111000  56   PRODUCT
         0111          ROUND-OFF CORRECTION TERM
                       WHEN PRODUCT IS POSITIVE
    +   01000000       CORRECTED PRODUCT
         0100          ROUNDED PRODUT Z
```

Fig. 6A

```
        1000   -8      MULTIPLICAND X
    ×   0001    1      MULTIPLIER Y
        11111000  -8   PRODUCT
         0111          ROUND-OFF CORRECTION TERM
                       WHEN PRODUCT IS NEGATIVE
    +   11111111       CORRECTED PRODUCT
         1111          ROUNDED PRODUT Z
```

MULTIPLYING METHOD WITH A ROUND-OFF FUNCTION AND CIRCUITRY THEREFOR

BACKGROUND OF THE INVENTION

The present invention relates to a multiplication system for digital signal processing and, more particularly, to a multiplying method with a positive/negative symmetrical round-off function for reducing an error, and circuitry therefor.

Multiplying circuitry with a round-off function has customarily been used to enhance the accuracy of the result of multiplication, as taught in, e.g., Japanese Patent Laid-Open Publication Nos. 64-53228 and 6-103304. However, the conventional multiplying circuitry has the following problems (1) through (3) left unsolved.

(1) When a plurality of products are accumulated, desired accuracy is not achievable with the round-off function. Specifically, when a ONE is added to a bit just below the figure to be rounded off, the mean value of the figure to be rounded off is not a ZERO. The resulting errors are sequentially accumulated.

(2) A method of the kind correcting an error is not feasible for a microprocessor or similar application which performs correction at each time of operation in order to store the result of operation in a register file. Specifically, assuming n-bit multiplication, a value for correcting an error appears only at a figure even lower than the lowermost bit of a 2n-bit product. Therefore, should the product be rounded of by correction at each time of calculation, the correction value would be rounded down and would thereby prevent the effect of correction from appearing in the resulting product.

(3) The circuitry is not practicable without scaling up hardware. The circuitry proposed in the above Laid-Open Publication No. 6-103304, for example, additionally includes a subtracter for the correction of the mean error of round-off calculation. This scales up hardware and therefore increases the processing time.

SUMMARY OF THE INVENTION

It is therefore an object of the present invention to provide a multiplying method capable of reducing an error particular to round-off and thereby enhancing accuracy in the event of multiplication and the accumulation of the results of multiplication, and circuitry therefor.

It is another object of the present invention to provide a multiplying method guaranteeing accurate calculation even when applied to, e.g., a microprocessor completing multiplication and round-off by a single calculation, and circuitry therefor.

It is another object of the present invention to provide multiplying circuitry needing a minimum of additional hardware and ensuring accurate calculation.

In accordance with the present invention, in a multiplying method with a round-off function and applicable to a multiplier or a product sum calculator, a product is rounded, if the uppermost one of bits of the product to be rounded is a ONE while the bits lower than the uppermost bit are ZEROs and if the product is positive, to a value greater than, but nearest to, the product and which can be expressed, or rounded, if the product is negative, to a value smaller than, but nearest to, the product and which an be expressed. Also, the product is rounded, if the product is greater than a value having a ONE at the uppermost one of the bits to be rounded and ZEROs at the bits lower than the uppermost bit, to a value greater than, but nearest to, the product and which can be expressed and without regard to the sign of the product, or rounded, if the product is greater than the above value and without regard to the sign of the product, to a value smaller than, but nearest to, the product and which can be expressed.

Also, in accordance with the present invention, in multiplying circuitry with a round-off function, when a product of a multiplicand and a multiplier is positive, a value having a ONE at the uppermost one of bits to be rounded and ZEROs at the other bits lower than the uppermost bit is applied to a subproduct adder or an adder as a round-off correction term. When the product is negative, a value having a ZERO at the uppermost bit and ONEs at the other bits is applied to the subproduct adder or the adder.

Further, in accordance with the present invention, in a multiplying circuitry with a round-off function and applicable to a multiplier or a product sum calculator, a value having a ZERO at the uppermost one of bits to be rounded and ONEs at the other bits lower than the uppermost bit is added by a subproduct adder as a round-off correction term. An inversion of an Exclusive-OR of the sign bit of a multiplicand and the sign of a multiplier is input to a carry input of an adder.

Moreover, in accordance with the present invention, in a multiplying circuitry with a round-off function and applicable to a multiplier or a product sum calculator, a value having a ZERO at the uppermost one of bits to be rounded and ONEs at the other bits lower than the uppermost bit is added by a subproduct adder as a round-off correction term. An inversion of an Exclusive-OR of the sign bit of a multiplicand and the sign of a multiplier is added at the lowermost bit of the subproduct adder.

In addition, in accordance with the present invention, in multiplying circuitry with a round-off function and applicable to a multiplier or a product sum calculator, when a product is positive, a value having a ONE at the uppermost one of bits to be rounded and ZEROs at the other bits lower than the uppermost bit is added by a subproduct adder. When the product is negative, a value having a ZERO at the uppermost bit and ONEs at the other bits is added by the subproduct adder.

BRIEF DESCRIPTION OF THE DRAWINGS

The above and other objects, features and advantages of the present invention will become apparent from the following detailed description taken with the accompanying drawings in which:

FIGS. 6A and 6B each shows a specific operation of the first embodiment;

DESCRIPTION OF THE PREFERRED EMBODIMENTS

Figure 1:
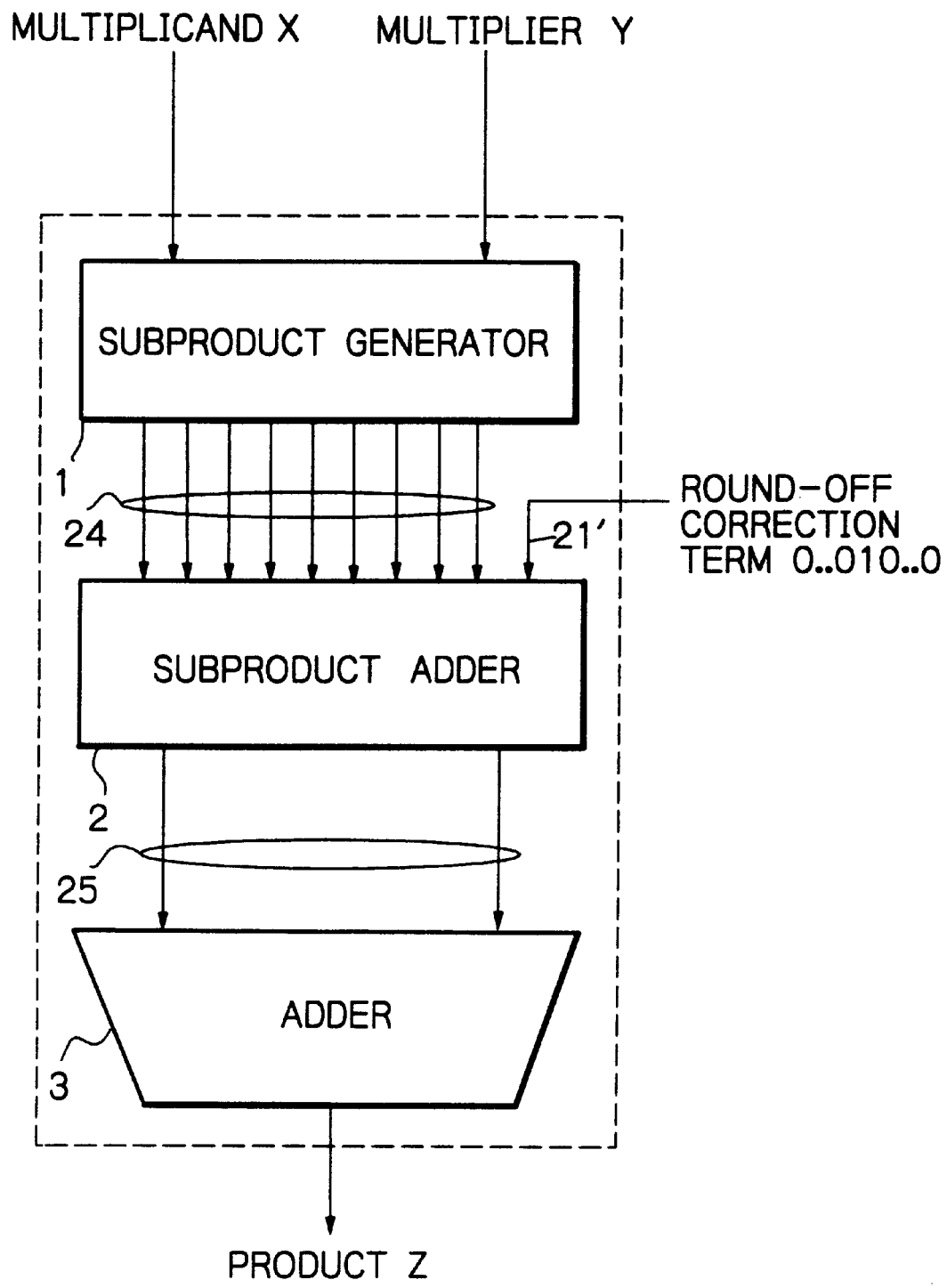
FIG. 1 is a block diagram schematically showing conventional multiplying circuitry with a round-off function.

To better understand the present invention, brief reference will be made to conventional multiplying circuitry with a round-off function, shown in FIG. 1. As shown, the multiplying circuitry is made up of a subproduct generator 1, a subproduct adder 2, and an adder 3. A multiplicand X and a multiplier Y are input to the subproduct generator 1. The subproduct generator 1 outputs a plurality of subproduct terms 24. Assuming eight bits, the subproduct generator 1 outputs five terms by using the Booth's method. When the fiver terms are added by the subproduct adder 2, two terms 25 are left. The adder 3 adds the two terms 25 and thereby outputs a product Z.

When a multiplier and a multiplicand each having n bits are multiplied, a 2n-bit product is produced. The 2n-bit product is rounded off to n bits because the subsequent calculation often has only an accuracy of n bits. For example, when upper n bits are selected, the lower n bits are rounded off by rounding up, rounding down or rounding to the nearest whole number. Rounding to the nearest whole number is desirable from the accuracy standpoint. Specifically, when the bit just below the upper n bits is a ONE, it will be rounded up; when such a bit is a ZERO, it will be rounded down. When a multiplier and a multiplicand each having eight bits are multiplied, the product before round-off has sixteen bits. In this case, binary "10000000" is added to the lower eight bits of the sixteen-bit product for correction, and then the upper eight bits are produced. This can be done if the subproduct adder 2 is provided with an extra input 21 and if the correction term (round-off correction term) is applied to the input 21. The two terms 25 output from the subproduct adder 2 are added by the adder 3.

Figure 2:
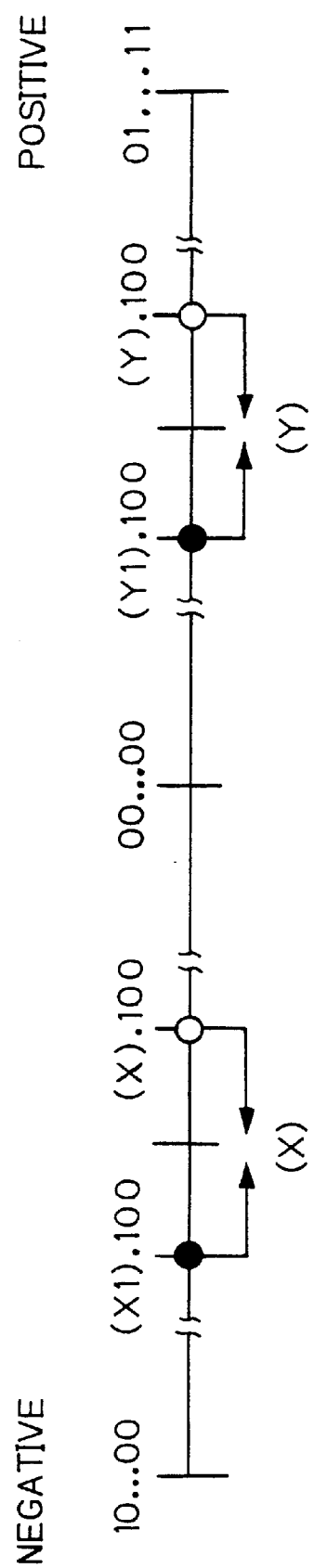
FIG. 2 demonstrates the operation of the circuitry shown in FIG. 1.

As shown in FIG. 2, the product output from the conventional circuitry of FIG. 1, whether it be positive or negative, is rounded off to the nearest greater value if a portion to be rounded off is greater than binary "10000000" or rounded down if it is smaller than "01111111", as indicated by dots. Circles shown in FIG. 2 show that the above portion does not included such a value.

Figure 3:
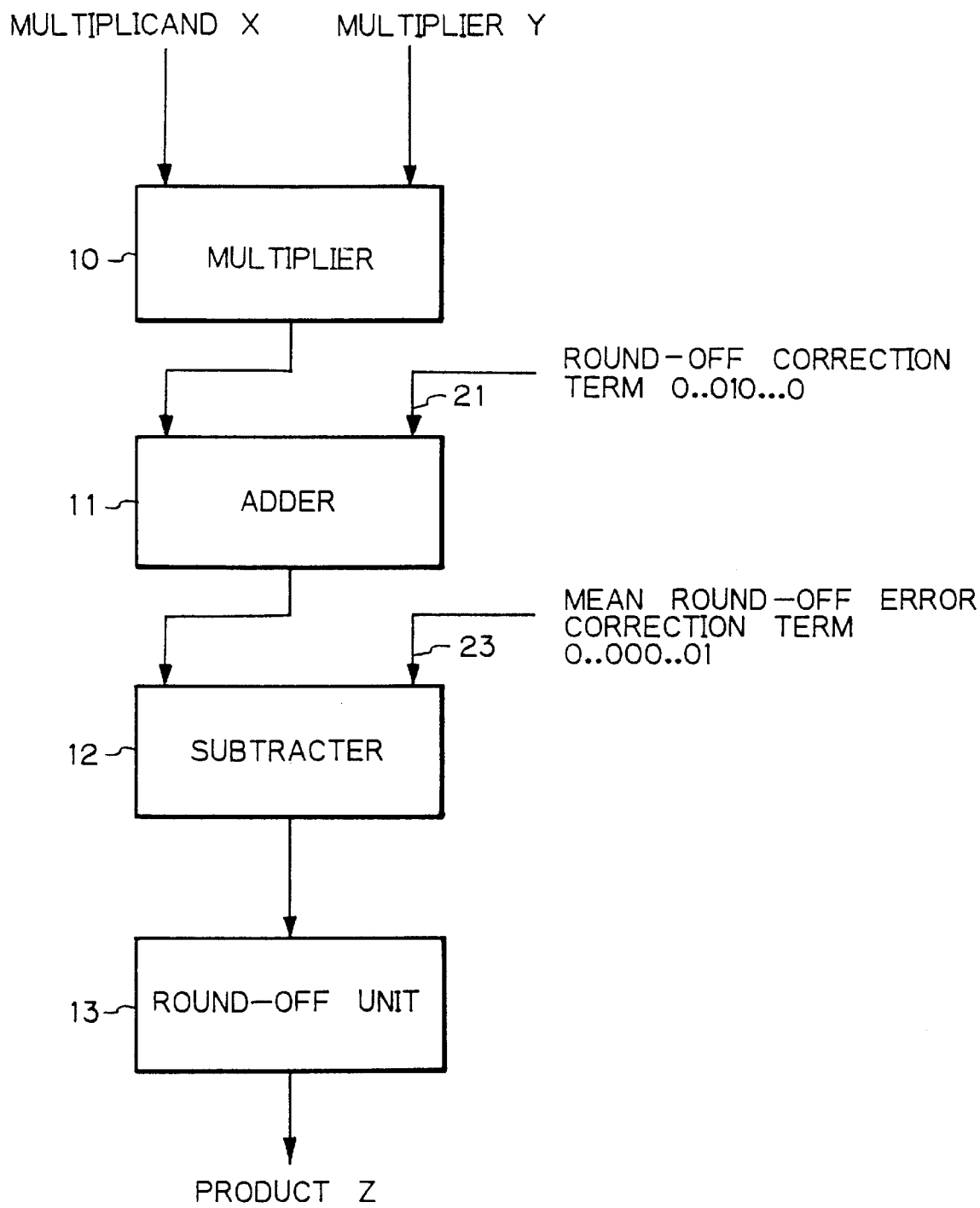
FIG. 3 is a block diagram schematically showing a conventional digital calculation system with a round-off function.

Signal processing, for example, often involves the addition of a plurality of products. In this respect, the round-off procedure of the kind described has a problem that the mean value of rounded portions is not a ZERO and appears in the form of an error. To reduce a mean accumulative error, Japanese Patent Laid-Open Publication No. 6-103304 mentioned earlier proposes a method which subtracts, before round-off, a mean error to be rounded off. Specifically, this document teaches a digital calculation system including a plurality of error correction circuits each preceding a particular round-off circuit other than the first round-off circuit. Each error correction circuit subtracts an error correction value in order to obviate a difference between the actual result and the ideal result. More specifically, as shown in FIG. 3, a multiplier 10 multiplies a multiplicand X and a multiplier Y. An adder 11 adds an addition term. A subtracter 12 subtracts a correction term for cancelling a mean error from the output of the adder 11. Finally, a round-off unit 13 rounds of the output of the subtracter 12 and outputs a product Z.

The conventional technologies described with reference to FIGS. 1–3 have some problems left unsolved, as discussed earlier.

Preferred embodiments of the present invention free from the problems of the conventional technologies will be described hereinafter.

1st Embodiment

Figure 4:
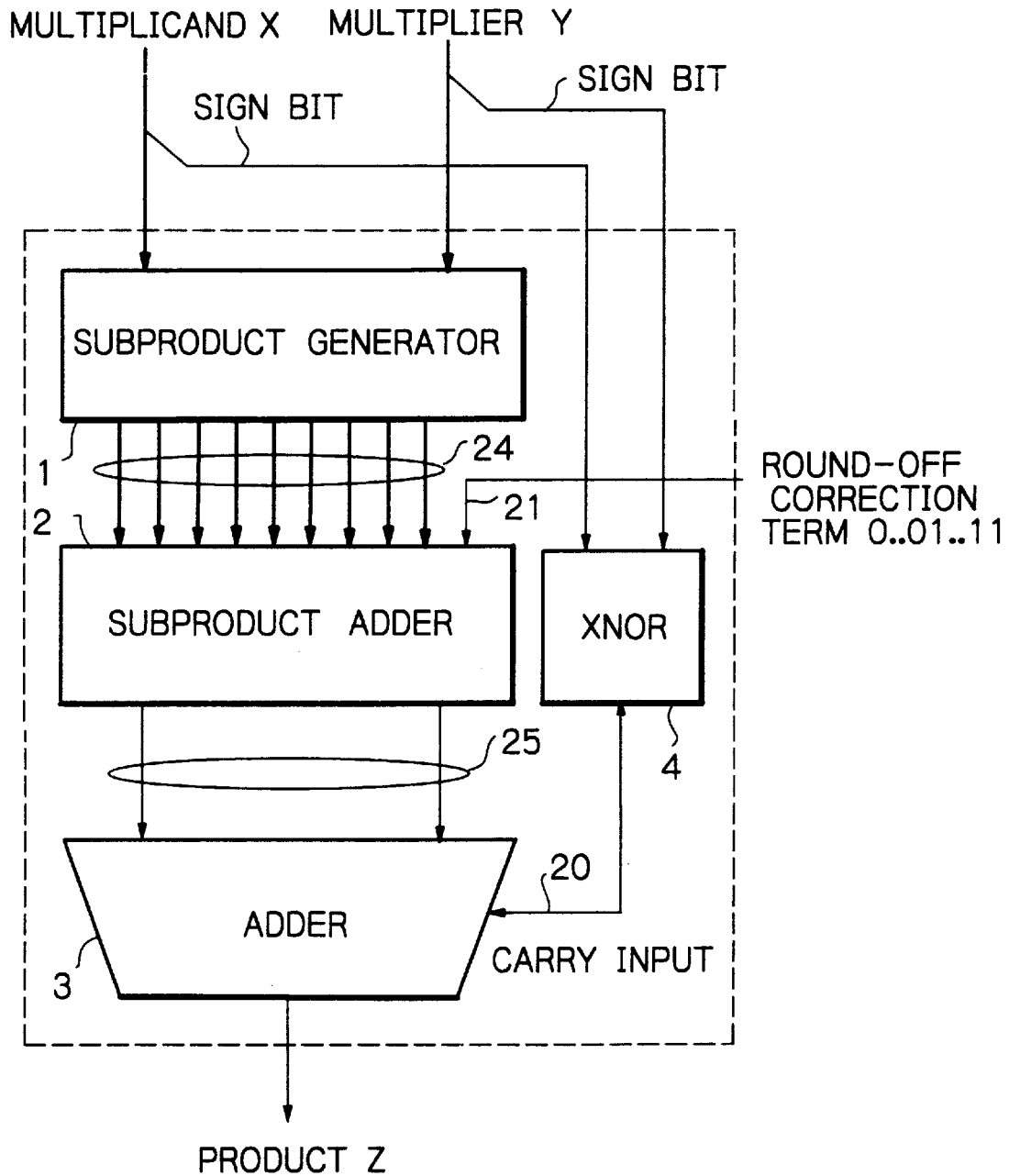
FIG. 4 is a block diagram schematically showing a first embodiment of the multiplying circuitry with a round-off function in accordance with the present invention.

Referring to FIG. 4, multiplying circuitry with a found-off function embodying the present invention is shown. As shown, the circuitry has a subproduct generator 1 to which a multiplicand X and a multiplier Y are input, a subproduct adder 2, an adder 3, and an XNOR (Exclusive NOR) gate 4 to which the sign bits of the multiplicand X and multiplier Y are input. A round-off correction term 21 is input to the subproduct adder 2. The output of the XNOR gate 4 is applied to the adder 3 as a carry input 20.

The subproduct generator 1 produces a plurality of subproduct terms 24 from the multiplicand X and multiplier Y input thereto. For example, when the multiplicand X and multiplier Y have eight bits each, the subproduct generator 1 outputs five subproduct terms 24 by use of the Booth's method. The subproduct terms 24 are input to the subproduct adder 2 and added thereby. The subproduct adder 2 is implemented by, e.g., a carrier save adder. The round-off correction term 21 is input to the subproduct adder 2 together with the subproduct terms 24. In the correction term 21, the uppermost bit of the figure to be rounded off is a ZERO while the bits lower than the uppermost bit are ONEs. For example, assume that the multiplicand X and multiplier Y have eight bits each, and that the upper eight bits should be left as a result of calculation while the lower eight bits should be rounded off. Then, the correction term 21 is binary "01111111". The subproduct adder 2, implemented by a carrier save adder by way of example, outputs two results 25 of subproduct addition. The adder 3 adds the two outputs 25 of the subproduct adder 2 and produces a product Z.

The sign bits of the multiplicand X and multiplier Y are input to the XNOR gate 4. The XNOR gate 4 outputs a ONE if the product is positive or outputs a ZERO if it is negative. The output of the XNOR gate 4 is applied to the carry input 20 of the adder 3.

Figure 5:
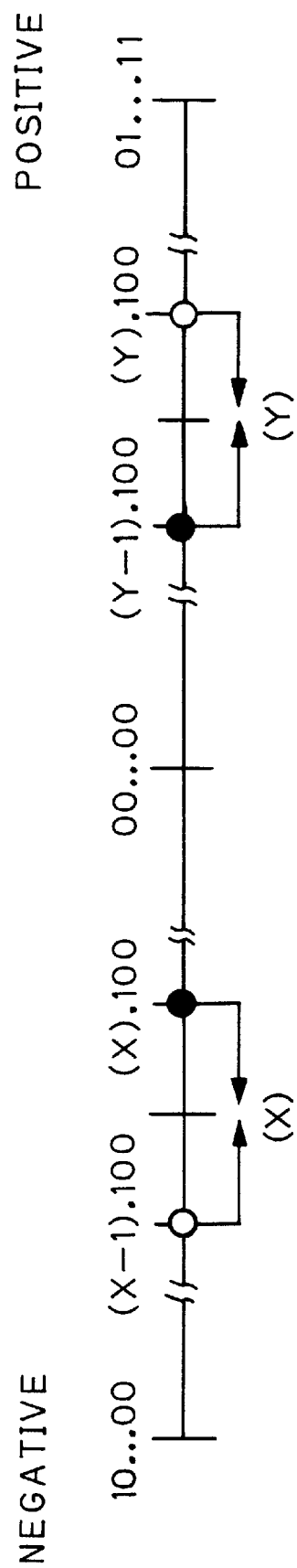
FIG. 5 shows the principle of operation of the first embodiment.

The operation of the illustrative embodiment will be described hereinafter. First, reference will be made to FIG. 5 for describing how the result of multiplication is rounded off. In FIG. 5, each portion extending from a circle to a dot is the range to be rounded off; the dot is included in this range, but the circle is not included.

If the result of multiplication is positive, and if the figure just below the figure to be rounded off is a ONE, then the result is rounded up, as in the conventional system. If the figure just below the figure to be rounded off is a ZERO, then the result of multiplication is rounded down, as in the conventional system. This kind of scheme corresponds to a round-off procedure which rounds up values above 0.5 inclusive and rounds down values below 0.5.

Assume the above result of multiplication is negative, and that only the figure just below the figure to be rounded off is a ONE while the figures below it are ZEROs. Then, values smaller than the above value are rounded down while values greater than the same are rounded up. This corresponds to a negative round-off procedure which rounds down values below 0.5 inclusive and rounds up values above 0.5.

With the above calculation, the illustrative embodiment allows a mean error output when the result is positive and a mean error output when it is negative to cancel each other. Consequently, the error is substantially zero when evenly spread products are accumulated.

FIGS. 6A and 6B demonstrate the fact that the illustrative embodiment produces the result shown in FIG. 5. Although FIGS. 6A and 6B show four-bit multiplication, the embodiment is practicable with any desired bit length. As shown in FIG. 6A, assume "1000" (=−8) and "1001" (=−7) as an exemplary multiplicand X and an exemplary multiplier Y, respectively, providing a positive product and providing lower four bits of "1000". The product of these multiplicand X and multiplier Y is "00111000" (=56) having eight bits. In this case, the correction term 21 to be input to the subproduct adder 2 is "0111". When the product is positive, the sign bit of the multiplicand X and that of the multiplier Y have the same value, causing the XNOR gate 4 to output "1". Because the product (="00111000"), correction term (="0111") and the output of the XNOR gate 4 (="1") are added, the result (corrected product) is "01000000". When this result is rounded off, "0100" is produced (see CORRECTED PRODUCT shown in FIG. 6A). In this manner, when the result is positive, "1000" is rounded up.

As shown in FIG. 6B, assume "1000" (=−8) and "0001" (=1) as an exemplary multiplicand X and an exemplary multiplier Y, respectively, providing a negative product and lower four bits of "1000". The product is "11111000" (=−8). In this case, the correction term 21 is "0111". When the product is negative, the sign bit of the multiplicand X and that of the multiplier Y are different from each other, causing the XNOR gate 4 to output "0". As a result, the sum of the product, correction value and the output of the XNOR gate 4 is "11111111". This result is rounded to "1111" (see CORRECTED PRODUCT shown in FIG. 6B). When the result is negative, "1000" is rounded down.

As stated above, when the product is positive, a value having a ONE at the uppermost one of the bits to be rounded (fourth bit) and ZEROs at the lower bits is used as a correction value ("0111"+"1"="1000"). When the product is negative, a value having a ZERO at the uppermost one of the bits to be rounded and ONEs at the lower bits is used as a correction value (="0111"). This coincides with the result shown in FIG. 5.

2nd Embodiment

Figure 7:
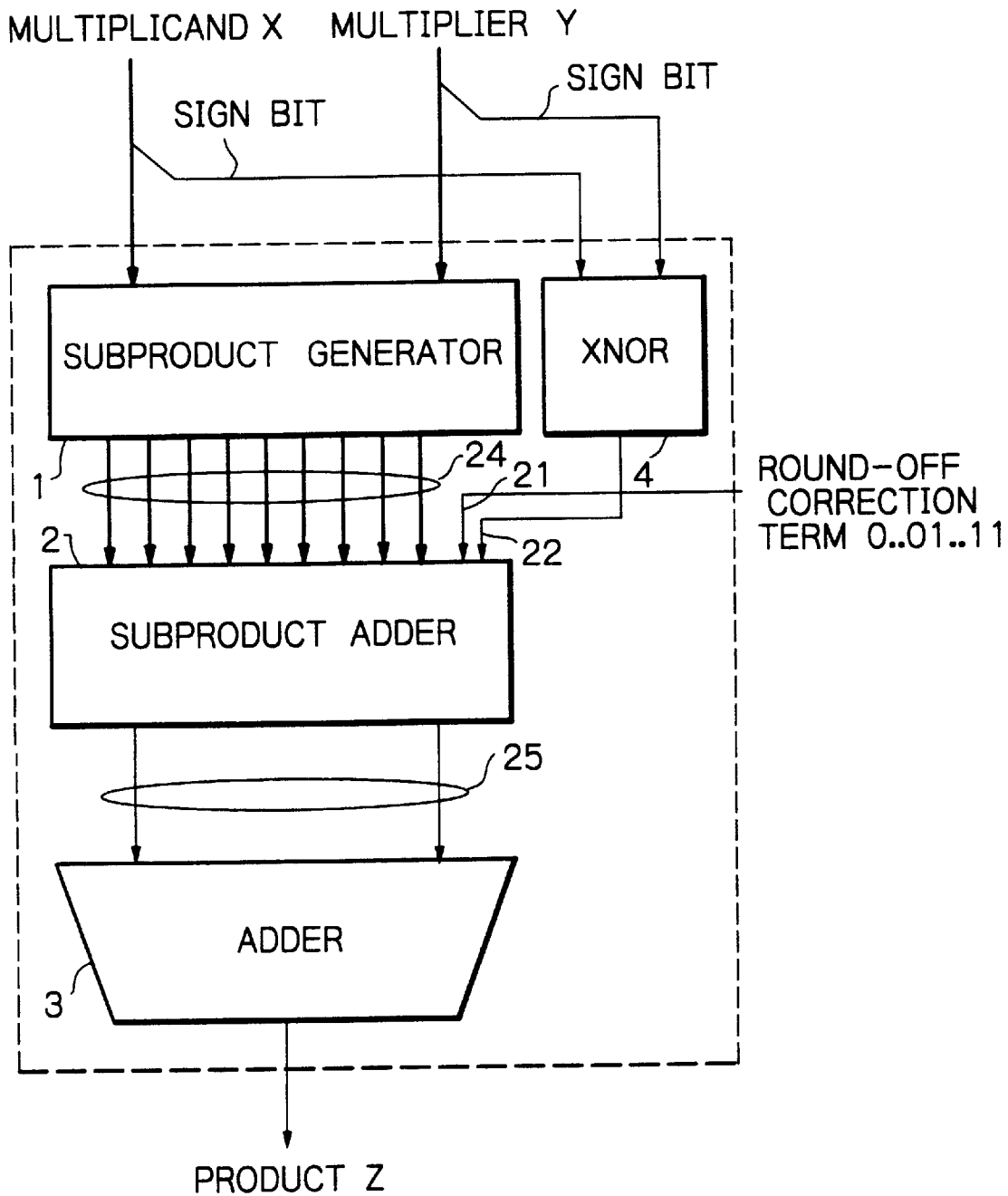
FIG. 7 is a schematic block diagram showing a second embodiment of the present invention.

Referring to FIG. 7, an alternative embodiment of the present invention will be described. In FIG. 7, the same or similar structural elements as or to the elements shown in FIG. 4 are designated by like reference numerals. As shown, a multiplicand X and a multiplier Y are input to the subproduct generator 1. A plurality of subproduct terms 24 are added by the subproduct adder 2. The round-off correction value 21 is input to the subproduct adder 2 together with the subproduct terms 24. The subproduct adder 2, implemented by a carrier save adder by way of example, outputs two terms 25. The adder 3 adds the two terms 25 and outputs a product Z. The XNOR gate 4 receives the sign bits of the multiplicand X and multiplier Y and outputs a ONE if the product is positive or outputs a ZERO if it is negative. In the illustrative embodiment, the output 22 of the XNOR gate 4 is also applied to the subproduct adder 2.

Figure 8:
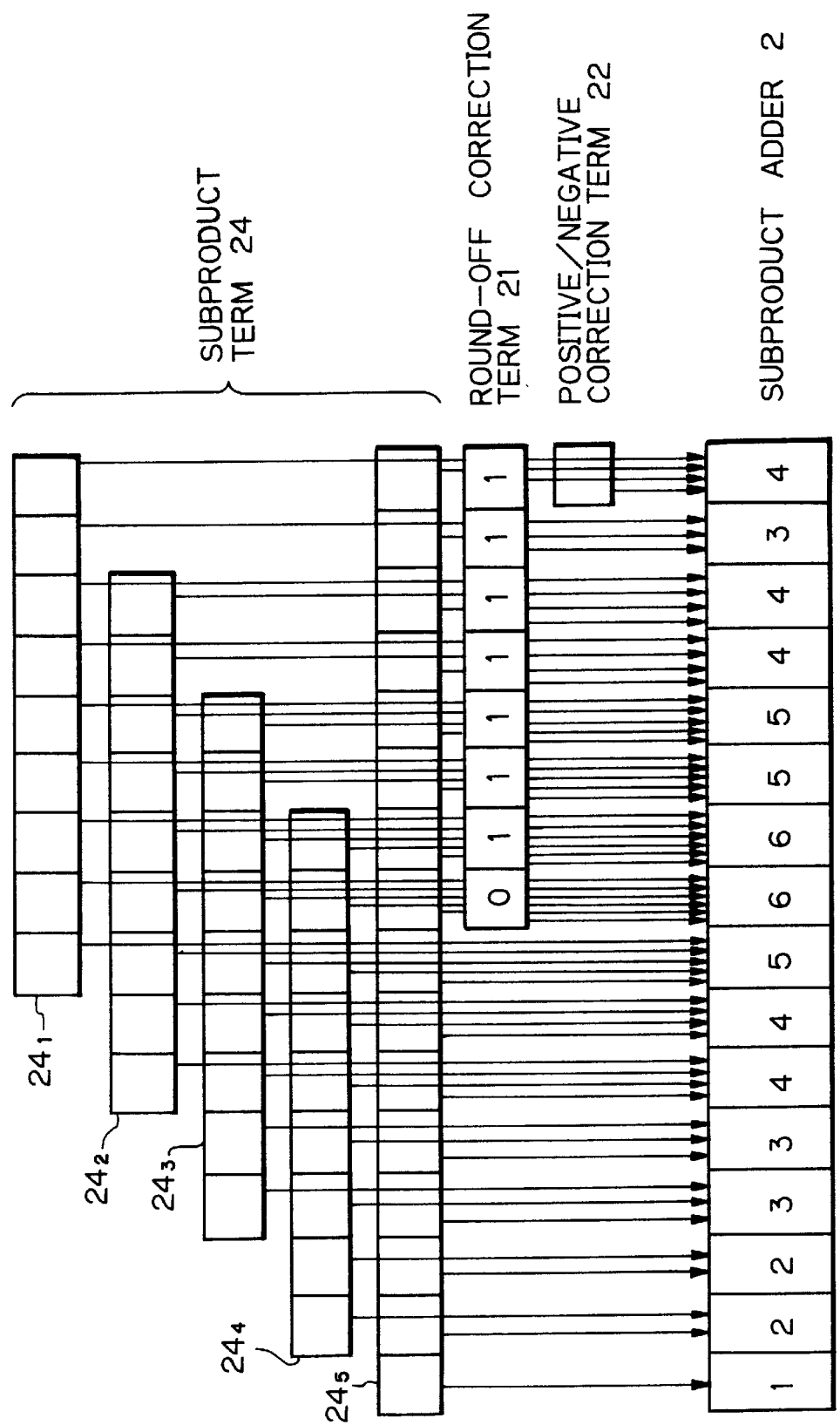
FIG. 8 shows the general configuration of a subproduct adder included in the second embodiment.

In this embodiment, the subproduct adder 2 has a configuration shown in FIG. 8. As shown, the subproduct terms output from the subproduct generator 1 have bits sequentially shifted in correspondence to the figure positions of the multiplier Y. Specifically, assuming eight-bit multiplication and the Booth's method, five subproduct terms 24 are output. Four ($24_1$–$24_4$, FIG. 8) of the five subproducts terms 24 have nine bits each. One ($24_1$) of the four terms ($24_1$–$24_4$) includes the lowermost bit of the product. Three ($24_2$–$24_4$) of the remaining terms each is shifted by two bits to the upper position. The last term ($24_5$) has sixteen bits.

As shown in FIG. 8, because addition is executed on a bit basis, the number of terms to be added is small at the bits close to the uppermost bit and lowermost bit, but it is great at the center. Numerals associated with SUBPRODUCT ADDER 2 in FIG. 8 indicate the numbers of inputs. For example, assuming eight-bit multiplication, a single term is added at the uppermost bit, three terms including the correction term 21 are added at the lowermost bit, and six terms are added at the seventh bit, as counted from the lowermost bit, at the center. A positive/negative correction term 22 is applied to the input of the subproduct adder 2 assigned to the lowermost bit and added to the lowermost bit thereby. As a result, the number of terms to be added at the lowermost bit increases to four. This, however, has no influence on the overall processing time, considering the fact that the maximum number of bits to be added is six.

3rd Embodiment

Figure 9:
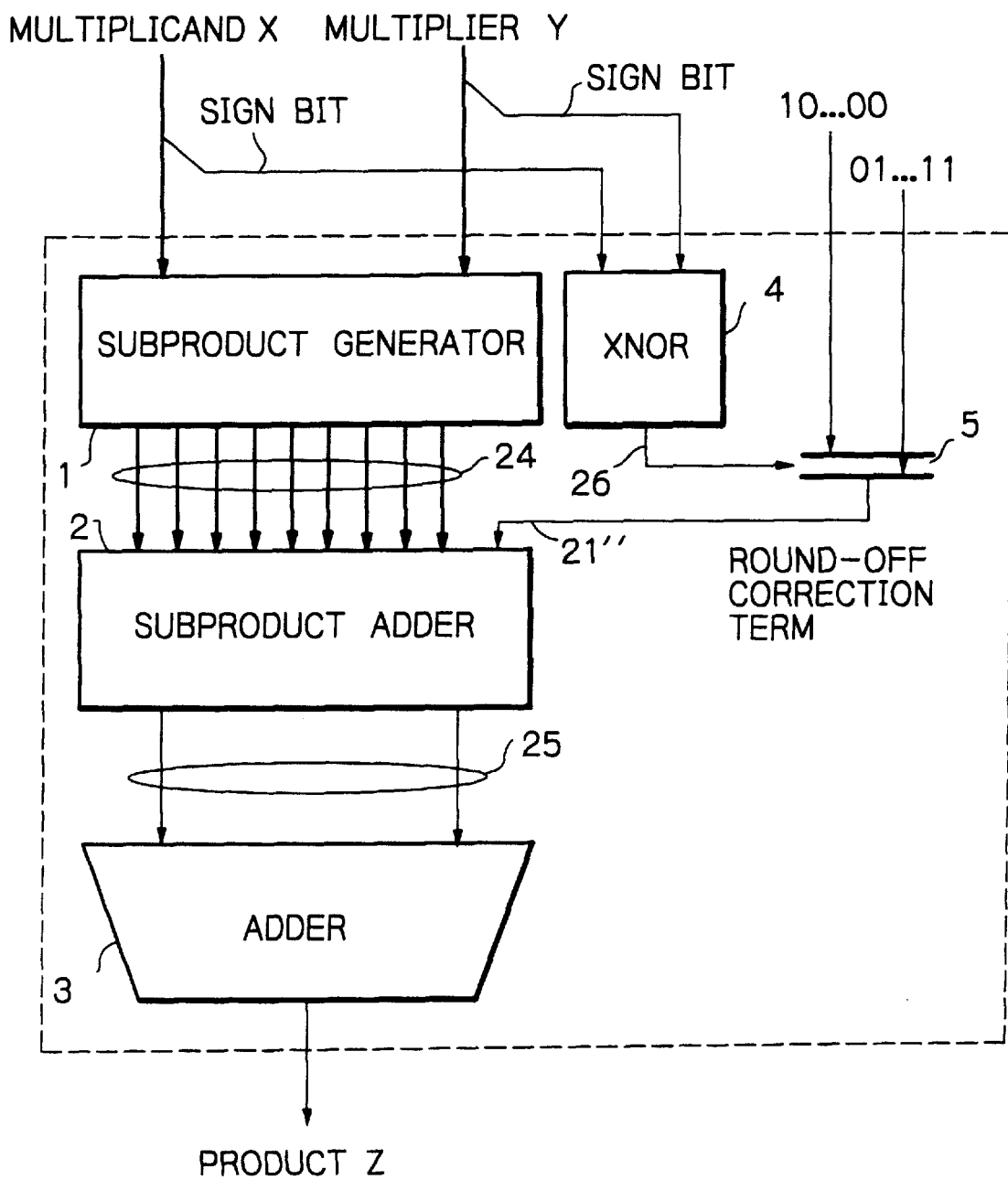
FIG. 9 is a schematic block diagram showing a third embodiment of the present invention.

FIG. 9 shows another alternative embodiment of the present invention. In FIG. 9, the same or similar structural elements as or to the elements shown in FIG. 4 are designated by like reference numerals. As shown, the embodiment includes the subproduct generator 1, subproduct adder 2 and adder 3 like the previous embodiments. In this embodiment, the signs of the multiplicand X and multiplier Y are fed to the XNOR gate 4 in order to produce a control signal 26. The XNOR gate 4 may be replaced with an XOR (Exclusive-OR) gate, if desired. The control signal 26 is applied to a selector 5 as a selection control signal. A value having a ONE at the uppermost bit and ZEROs at the other bits and a value having a ZERO at the uppermost bit and ONEs at the other bits are input to the selector 5. The control signal 26 causes the selector 5 to select the former value when the product is positive or causes it to select the latter value when the product is negative. The value selected by the selector 5 is input to the subproduct adder 2. The resulting product Z has been rounded, as described with reference to FIG. 5.

4th Embodiment

Figure 10:
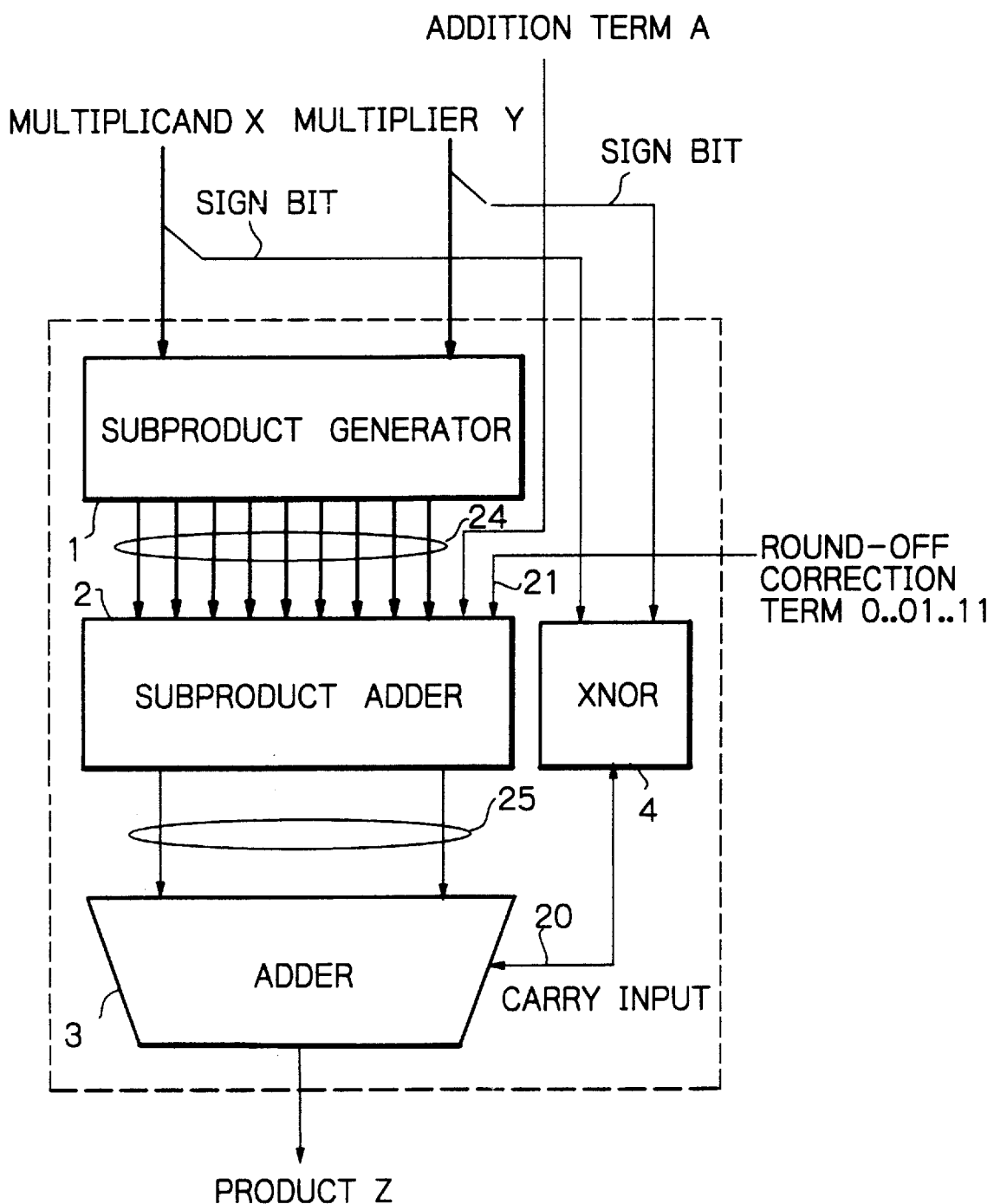
FIG. 10 is a schematic block diagram showing a fourth embodiment of the present invention.

FIG. 10 shows a further alternative embodiment of the present invention which is applied to product sum calculation. In FIG. 10, the same or similar structural elements as or to the elements shown in FIG. 4 are designated by like reference numerals. As shown, the subproduct generator 1 produces a plurality of subproduct terms 24 from a multiplicand X and a multiplier Y. The subproduct adder 2 adds the subproduct terms 24, round-off correction term 21 and an addition term A. The subproduct adder 2 outputs two values 25. The adder 3 adds the two values 25 output from the subproduct adder 2. The signs of the multiplicand X and multiplier Y are fed to the XNOR gate 4. The XNOR gate 4 outputs a ONE if the product is positive or outputs a ZERO if it is negative. The output of the XNOR gate 4 is applied to the carry input 20 of the adder 3.

Assume that the circuitry shown in FIG. 10 is built in, e.g., a microprocessor. Then, the multiplier, multiplicand and addition term have the same number of bits, n, because they are produced from a register file. While the resulting product has 2n bits, n bits are produced by round-off. Because the bit positions of the addition term are matched to the n bits to be produced, the values of the bits relating to round-off are derived from multiplication. Therefore, the rounding direction may be determined on the basis of the sign of the result of multiplication.

The associative law does not hold with the round-off procedure. Therefore, although the addition term may have 2n bits, the result would depend on the order of calculation if round-off were not executed with the multiplication term. It follows that when round-off is effected at each time of calculation, it is reasonable to executed round-off only with the product.

The first to fourth embodiments shown and described may be summarized, as follows. A subproduct adder (2, FIG. 4) adds subproduct terms (24, FIG. 4) and a correction term (21, FIG. 4) in which the uppermost one of bits to be rounded is a ZERO and the lower bits are ONEs. When the product is positive, as indicated by the sign bit of a multiplicand and that of a multiplier, a ONE is output while, when the product is negative, a ZERO is output. This ONE or ZERO is applied to the carry input (20, FIG. 4) of an adder (3, FIG. 4) or to the lower bit input (22, FIG. 7) of the subproduct adder. As a result, the product is rounded to the nearest whole number without regard to its sign. Specifically, the subproduct adder and adder add, when the product is positive, a value having a ONE at the uppermost one of the bits to be rounded and ZEROs at the lower bits or add, when the product is negative, a value having a ZERO at the uppermost one of the bits to be rounded and ONEs at the lower bits.

In the illustrative embodiments, because the mean value of the portions to be rounded is not a ZERO, an error ascribable to the round-off of products appears when the products are accumulated. However, round-off when the product is positive and round-off when it is negative are symmetrical to each other, allowing an error in the former case and an error in the latter case to cancel each other. As a result, the error at the time of accumulation is substantially zero, enhancing accurate calculation. Further, because only the product is rounded to the nearest whole number, the effect of correction is not deteriorated even if round-off is executed at each time of calculation. Therefore, desirable effects are achievable even when the embodiments are applied to a microprocessor of the type executing round-off with the result of every calculation.

In summary, it will be seen that the present invention provides multiplying circuitry with a round-off function and having various unprecedented advantages, as enumerated below.

(1) The circuitry reduces an error at the time of accumulation of products. Specifically, round-off when the product is positive and round-off when it is negative are symmetrical to each other, allowing a mean accumulative error in the former case and a mean accumulative error in the latter case to cancel each other. As a result, the error at the time of accumulation is substantially zero.

(2) The circuitry is desirably applicable even to, e.g., a microprocessor executing multiplication to round-off by a single calculation. Specifically, the circuitry simply performs rounding to the nearest whole number, as distinguished from subtraction of a correction term using bits exceeding calculation accuracy. As a result, the bits left after round-off reflect both the effect of round-off and the effect of error cancellation.

(3) The circuitry needs a minimum of additional hardware because only an XNOR gate for determining the sign of a product and an arrangement for adding it are added. To add the sign of a product, use may be made of the carry input of an adder, or the addition tree of the lowermost bit of a subproduct adder may be changed from a three-input configuration to a four-input configuration.

Various modifications will become possible for those skilled in the art after receiving the teachings of the present disclosure without departing from the scope thereof.

What is claimed is:

1. A multiplying method with a round-off function and applicable to a multiplier or a product sum calculator, the method comprising the steps of generating a product from two binary numbers rounding the product, if an uppermost one of bits of the product to be rounded is a ONE while the bits lower than the uppermost bit are ZEROs and if the product is positive, to a value greater than, but nearest to, the product and which can be expressed, and rounding the product, if the product is negative, to a value smaller than, but nearest to, the product and which can be expressed;

rounding the product, if the product is greater than a value having a ONE at the uppermost one of the bits to be rounded and ZEROs at the bits lower than the uppermost bit, to a value greater than, but nearest to, the product and which can be expressed and without regard to a sign of the product, and rounding the product, if the product is smaller than said value having a ONE at the uppermost one of the its to be rounded and ZEROs at the bits lower than the uppermost bit, and without regard to the sign of the product, to a value smaller than, but nearest to, the product and which can be expressed.

2. Multiplying circuitry with a round-off function, wherein when a product of a multiplicand and a multiplier is positive, a value having a ONE at an uppermost one of bits to be rounded and ZEROs at the other bits lower than the uppermost bit is applied to a subproduct adder or an adder as a round-off correction term, or when the product is negative, a value having a ZERO at the uppermost bit and ONEs at the other bits is applied to said subproduct adder or said adder.

3. Multiplying circuitry with a round-off function, wherein in a multiplier or a product sum calculator a value having a ZERO at an uppermost one of bits to be rounded and ONEs at the other bits lower than the uppermost bit is added by a subproduct adder as a round-off correction term, and wherein an inversion of an Exclusive-OR of a sign bit of a multiplicand and a sign of a multiplier is input to a carry input of an adder.

4. Multiplying circuitry with a round-off function, wherein in a multiplier or a product sum calculator a value having a ZERO at an uppermost one of bits to be rounded and ONEs at the other bits lower than the uppermost bit is added by a subproduct adder as a round-off correction term, and wherein an inversion of an Exclusive-OR of a sign bit of a multiplicand and a sign of a multiplier is added at a lowermost bit of said subproduct adder.

5. Multiplying circuitry with a round-off function, wherein in a multiplier or a product sum calculator when a product is positive, a value having a ONE at an uppermost one of bits to be rounded and ZEROs at the other bits lower than the uppermost bit is added by a subproduct adder, or when the product is negative, a value having a ZERO at the uppermost bit and ONEs at the other bits is added by said subproduct adder.

* * * * *